June 21, 1955

A. F. NATKIE 2,711,025

RAFTER MEASURING DEVICE

Filed Sept. 11, 1952

3 Sheets-Sheet 1

INVENTOR

Adam Frank Natkie

BY Gustave Miller

ATTORNEY

INVENTOR
Adam Frank Natkie
BY Gustave Miller
ATTORNEY

June 21, 1955 A. F. NATKIE 2,711,025

RAFTER MEASURING DEVICE

Filed Sept. 11, 1952 3 Sheets-Sheet 3

INVENTOR

Adam Frank Natkie

BY Gustave Miller

ATTORNEY

1

2,711,025

RAFTER MEASURING DEVICE

Adam Frank Natkie, Metedeconk, N. J.

Application September 11, 1952, Serial No. 309,000

1 Claim. (Cl. 33—104)

This invention relates to a measuring device for use by carpenters for building house roofs and particularly relates to a device which can be used to show the position and angle of a side cut such as for a hip or valley rafter in relation to a common rafter, and which can, thereafter, be used to mark off such side cut.

The embodiment of the invention shown here comprises a plate having tables on either side thereof. The plate may be of plastic, metal, wood, or the like. The device may be used to measure the side cuts on any type of rafter but is shown here as applied to common rafters and to hip or valley rafters. In using the device, the true rafter length is determined from the table and the plate then positioned at that point which marks the end of the rafter at the appropriate angle for the particular side cut and the cut-line is marked off, using the plate like a T-square, one edge of the plate having a linear scale thereon. The proper cornice overhang is then determined and the plate is used to measure and mark off the ridge cut.

One object of this invention is to measure the true rafter length and to mark off the appropriate side cut without the use of involved calculations or of actual measurement.

Another object of this invention is to provide tables for indicating the true rafter lengths at a glance.

Another object of this invention is to provide predetermined markers to indicate the required side cuts for various rafter lengths and angles of rise.

Other objects of this invention are to provide an improved device of the character described, that is easily and economically produced, which is sturdy in construction, and which is highly effective in operation.

With the above and related objects in view, this invention consists in the details of construction and combination of parts, as will be more fully understood from the following description, when read in conjunction with the accompanying drawings in which.

Figure 1:
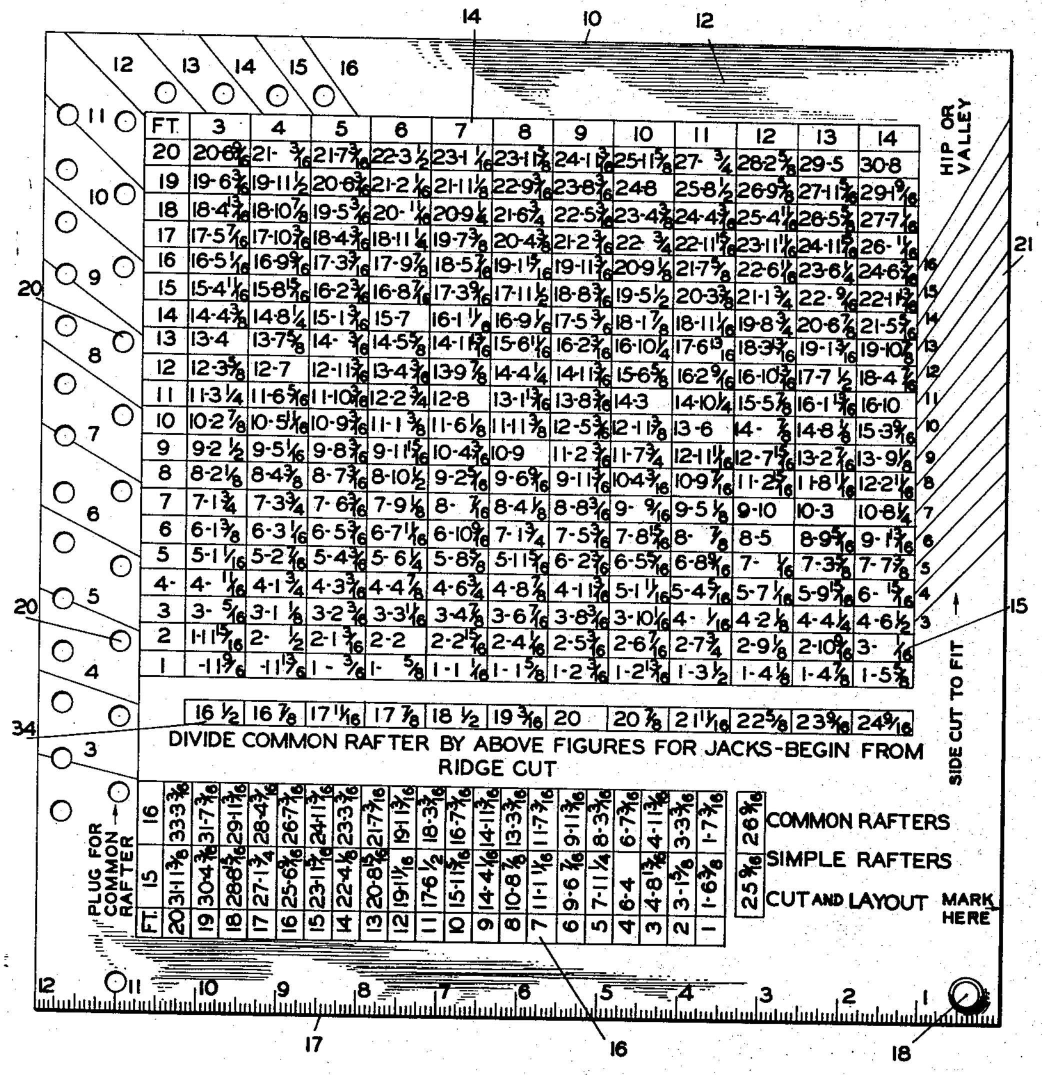
Fig. 1 is a front view of the table on one side of the plate used for a common rafter.
Figure 2:
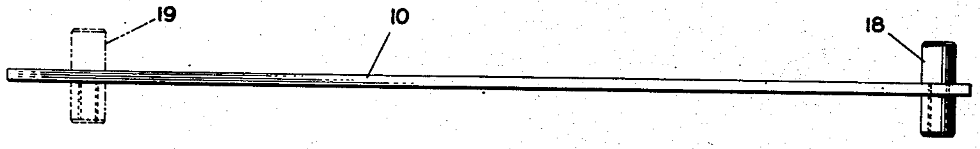
Fig. 2 is a side view of the plate showing the permanent plug.
Figure 3:
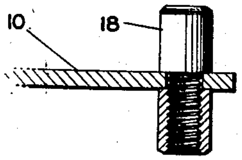
Fig. 3 is a sectional view of the permanent plug.

Referring now in greater detail to the drawings wherein similar reference characters refer to similar parts, there is shown a plate 10 of plastic, metal, wood or the like. On one face of 12 of the plate is provided a table 14 indicating the length of a common rafter for different angles of rise and for different flat distances to be covered.

2

The table is divided into two parts, one part 15, having vertical columns each indicating a different rise from 3 inches to 14 inches, and the other part 16, indicating rises of 15 and 16 inches. Columns perpendicular to the first columns indicate the flat distances to be covered by a rafter, and these columns range from 1 to 20 feet. The boxes formed by these two sets of columns each indicate the true length of a rafter necessary to cover a certain flat distance at a designated angle of rise. A permanent plug 18 is provided at the lower right hand corner of this face of the plate and a series of openings are formed along the opposite side of the plate each corresponding to a number located above it, and each being adapted to receive a removable plug 19 therein.

The true length of a rafter is read on the table. For example, the true length of a common rafter having a 7 inch rise on a 32 foot house is determined by looking in the box corresponding to vertical column 7 and horizontal column 16. The number 18.5$\frac{7}{16}$ appearing there is the true length in feet of the rafter. The horizontal column member 16 is used because the rafter covers half the width of the roof.

Figures 5, 6, 7:
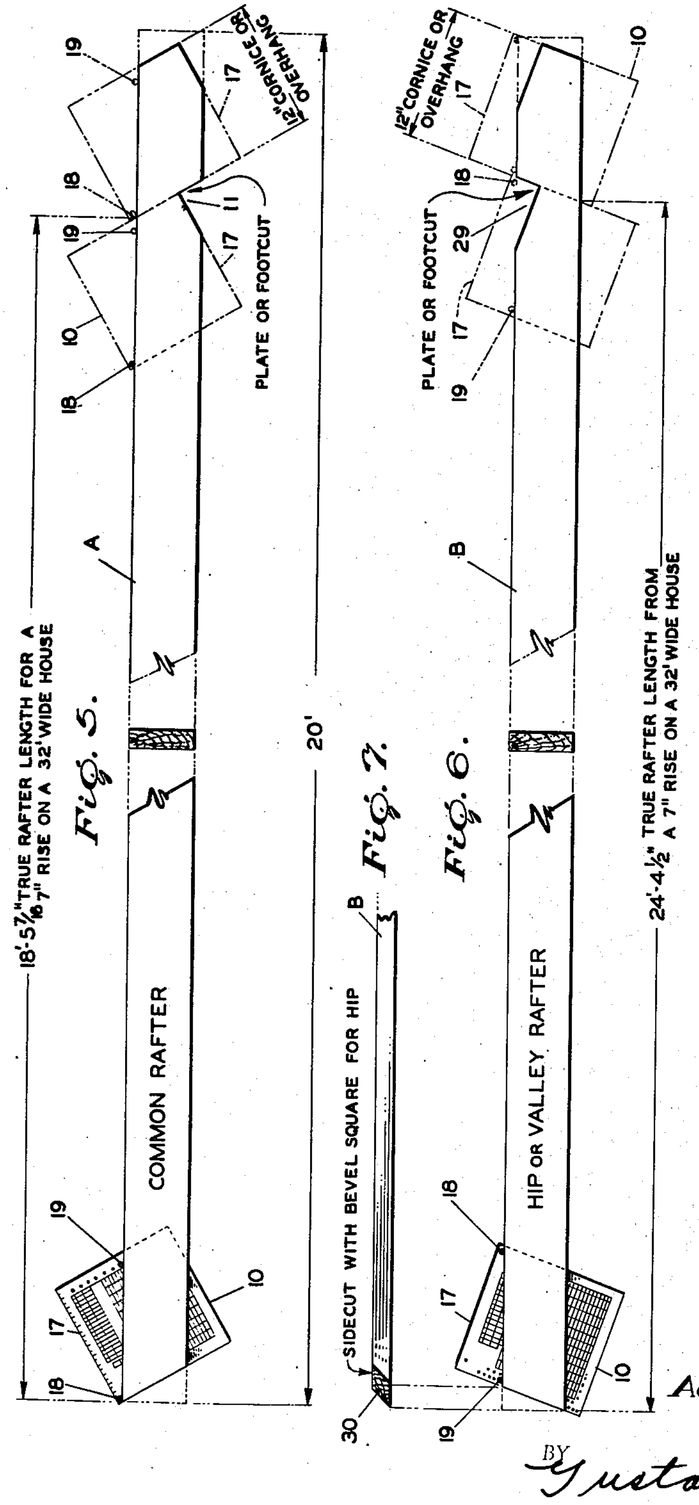
Fig. 5 is a view showing the plate positioned on a common rafter.
Fig. 6 is a view showing the plate positioned on a hip or valley rafter.
Fig. 7 is a side view of the rafter shown in Fig. 6.

Appropriate side cuts, hip or valley, are indicated at the right of the plate at 21. These side cuts correspond to the openings 20 at the left. In order to mark off the side cuts on a common rafter, the removable plug is placed in the appropriate opening 20 and the plate is positioned on the rafter at the appropriate place and angle, the angle being formed by the two plugs. If, for example, the removable plug is placed in opening 16, the correct side cut will be indicated by the line above 16 on scale 21. This is shown at the right end of common rafter A in Fig. 5. As indicated in Fig. 5, the plate is also used to mark off a ridge cut 11. This is done by determining the length of the cornice overhang and positioning the plate at that distance from the side cut, thereafter marking off the ridge cut as indicated in Fig. 5. In marking off the cuts, the edge 17 of the plate, having a linear scale thereon, is used like a T-square or triangle to draw the cut-line and to indicate its length.

On the reverse side 22 of plate 10 is provided a table 24 similar to table 14 but referring to a hip or valley rafter rather than a common rafter. The vertical and horizontal columns 25 and 26 are similar to columns 14 and 15 of the table on the other side and intersect to form boxes wherein are indicated the true lengths of hip or valley rafters. The permanent plug 18, which projects through both faces of the plate 10, is here shown at the lower left hand corner and the openings 27, at the right side of the table are for the purpose of receiving the removable plug. The appropriate side cuts for the hip or valley rafters are indicated at 28.

When the side cut is to be obtained for a hip or valley rafter, the removable plug 19 is inserted in the appropriate opening 27 and the plate 10 positioned on hip or valley rafter B as indicated in Fig. 6 to obtain the indication of the proper side cut. The ridge cut 29 is formed in similar manner to that explained for the common rafter. The device may also be used to mark off the appropriate side cut for a hip as indicated at 30 in Fig. 7.

Figure 8:
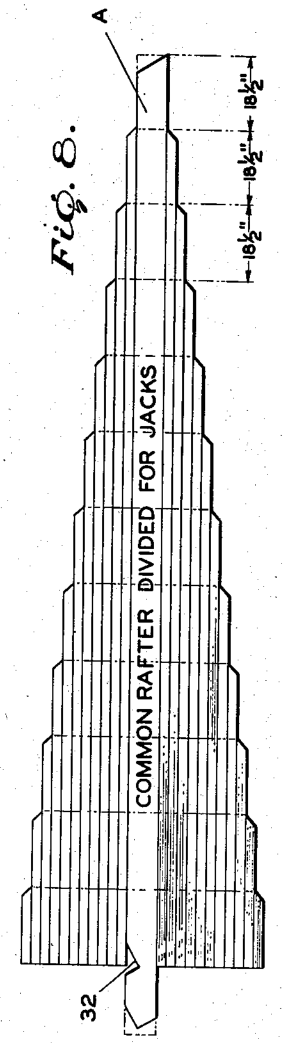
Fig. 8 is a view of a common rafter measured for jacks.
Figure 4:
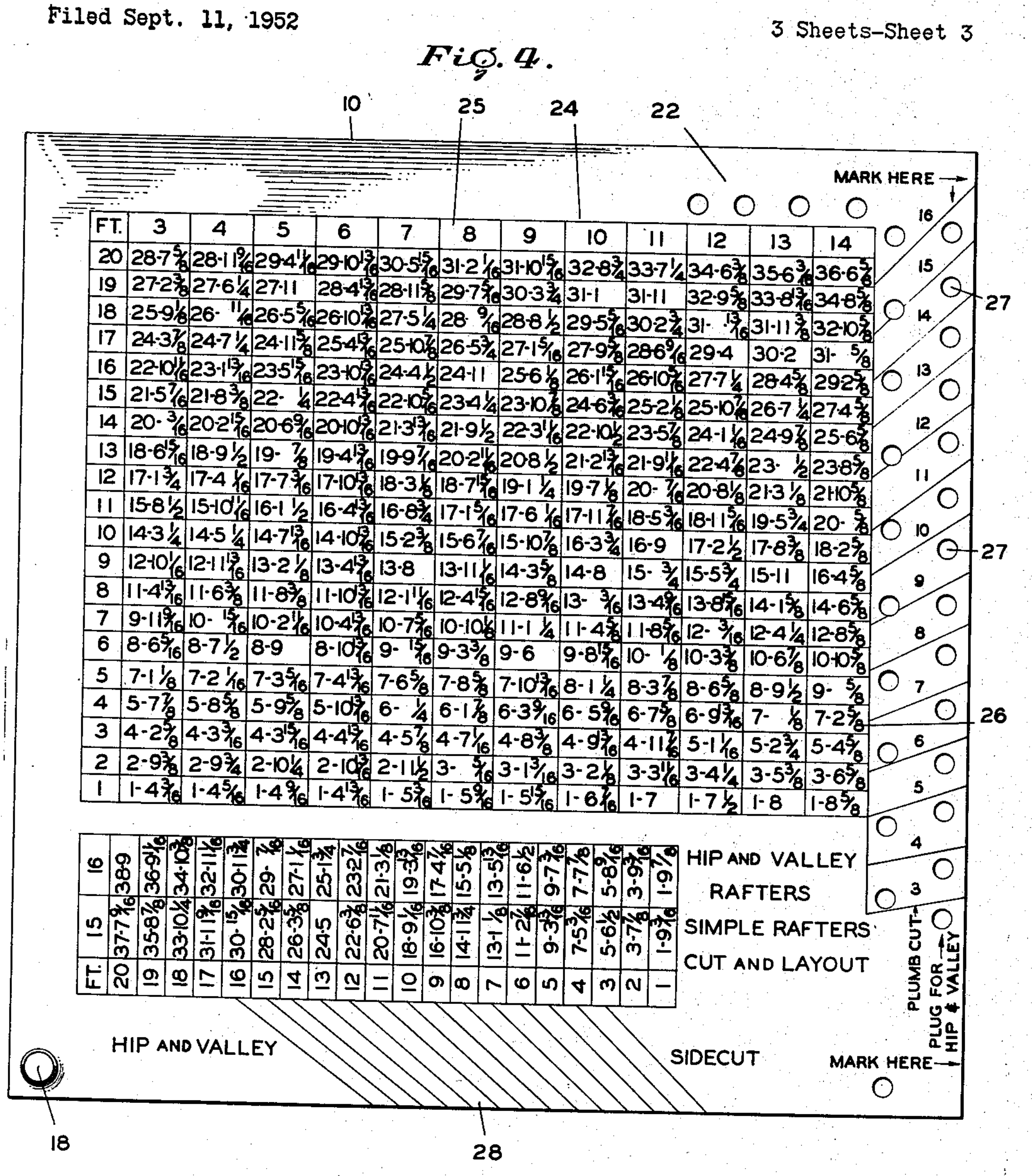
Fig. 4 is a view of the other side of the plate showing a table used for hip and valley rafters.

In Fig. 8 is shown the common rafter A divided for jack rafters beginning from the plate cut 32. The figure 18½ is determined from the table 34 shown in Fig. 1.

Although this invention has been described in considerable detail, such description is intended as being illustrative rather than limiting, since the invention may be variously embodied, and the scope of the invention is to be determined as claimed.

What is claimed as the invention is:

A protractor for laying out angles of cut for common, hip, or valley rafters, comprising a square plate having a first and a second bounding edge adjacent each other, a positioning pin secured in a hole adjacent the meeting ends of said first and second edges and projecting from each side of said plate, said plate having a graduated double row of holes therethrough along a third edge, said third edge being adjacent said second edge, said plate also having a graduated single row of holes along a portion of its fourth edge at the end adjacent said third edge, a plug removably engageable with any one of said holes on either side of said plate, said plug when in one of said holes and said positioning pin adapted and arranged to engage the edge of a rafter whereby said first edge marks the angle of ridge cut and said third and fourth sides mark the angle of plate cut, said plate having indicia on one side indicating one row of holes being graduated for common rafters and on the other side for hip and valley rafters.

References Cited in the file of this patent

UNITED STATES PATENTS

| | | |
|---|---|---|
| 1,178,985 | Zurich | Apr. 11, 1916 |
| 2,508,837 | Peffers | May 23, 1950 |
| 2,556,781 | Smithson | June 12, 1951 |